Aug. 15, 1939     P. STRANDBERG     2,169,820
REFRIGERATION
Filed July 20, 1938
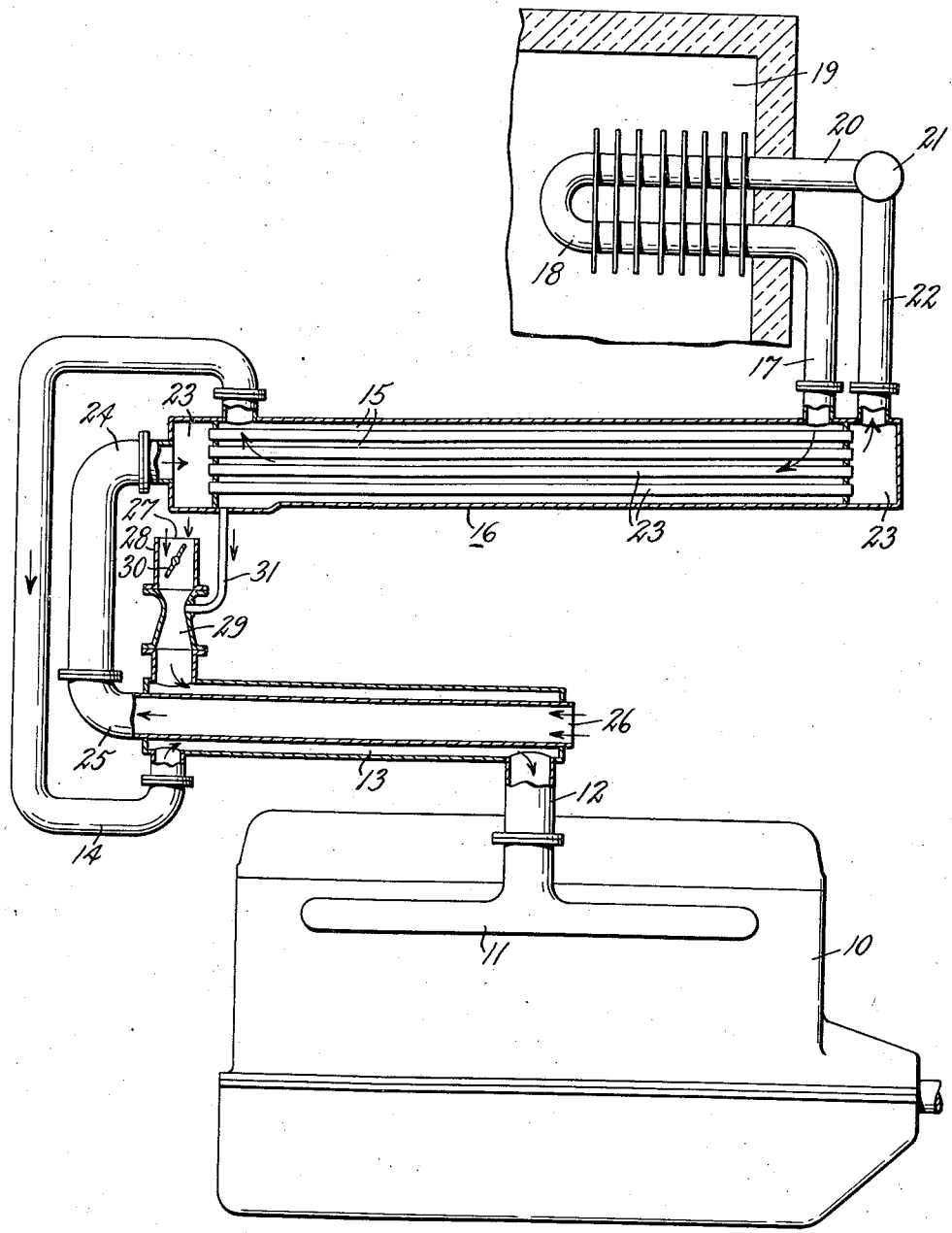
INVENTOR.
Paul Strandberg
BY
D. E. Heath
his ATTORNEY.

Patented Aug. 15, 1939

2,169,820

UNITED STATES PATENT OFFICE 2,169,820

REFRIGERATION

Paul Strandberg, Stockholm, Sweden, assignor, by mesne assignments, to Servel, Inc., New York, N. Y., a corporation of Delaware Application July 20, 1938, Serial No. 220,208

8 Claims. (Cl. 62—169)

My invention relates to refrigeration obtained in connection with operation of internal combustion engines generally as described in Reissue Patent No. 19,350 to Carl Georg Munters and Sigurd Mattias Bäckström, and it is an object of the invention to provide in such a system an auxiliary evaporator for precooling of fluid flowing to a principal evaporator as more fully set forth in the following description and accompanying drawing of which the figure shows more or less schematically an internal combustion engine and refrigeration system embodying the invention.

Referring to the drawing, an internal combustion engine 10 has an intake manifold 11 connected by a conduit 12 to an auxiliary evaporator 13. The other end of evaporator 13 is connected by a conduit 14 to one passage 15 of a gas heat exchanger 16. The gas heat exchanger passage 15 is connected by a conduit 17 to one end of a principal evaporator 18. The evaporator 18 is provided with heat transfer fins and located in an insulated refrigerator compartment 19. The other end of evaporator 18 is connected by a conduit 20 to a carburetor 21. Liquid fuel is supplied to the carburetor 21 in known manner, not illustrated. The air inlet of carburetor 21 is connected by a conduit 22 to one end of the other passage 23 of the gas heat exchanger 16. The other end of gas heat exchanger passage 23 is connected by a conduit 24 to an air inlet conduit 25 which extends centrally through the auxiliary evaporator 13 and has an open end 26 where atmospheric air or air from a cleaner enters.

An air inlet for evaporator 13 is provided at 27 by a conduit 28 in which there is a Venturi passage 29 or other suitable throttling device. Air inlet 27 is controlled by a valve 30. The gas heat exchanger 16 is slightly tilted from horizontal and the lower end of outer passage 15 is connected by a conduit 31 to the throat of the throttling passage 29.

In operation, liquid fuel is supplied to the carburetor 21 in any suitable manner and air is drawn in at inlets 26 and 27. Air which enters the opening 26 flows through pipe 25, pipe 24, gas heat exchanger passage 23, pipe 22, and carburetor 21 to the evaporator 18. Liquid fuel is atomized into the air stream in carburetor 21 and atomized liquid fuel vaporizes and diffuses into air in evaporator 18 producing a cooling effect. Unevaporated liquid and the mixture of air and fuel vapor flow from the evaporator through conduit 17 to the outer passage 15 of gas heat exchanger 16. The air and vapor mixture then flows through conduit 14 to evaporator 13 and thence through pipe 12 and manifold 11 to the engine 10.

Air which enters opening 27 flows through the throttle passage 29 into evaporator 13 and there joins the combustible mixture of fuel vapor and air flowing to the engine 10 in the previously described path. Unevaporated liquid flows downward in the outer heat exchanger passage 15 and from the lower end of this passage flows through conduit 31 to the throat of the throttle passage 29 where it is atomized into the air and carried therewith into the evaporator 5 where it evaporates and diffuses into the air and vapor mixture producing a cooling effect for precooling of air flowing through the evaporator in conduit 25. Flow of liquid through conduit 31 is carried out by suction caused by pressure reduction at the throat of throttle passage 29.

Air which enters opening 26 and then flows to the evaporator 20 as previously described is precooled in evaporator 13 and heat exchanger 16. To increase the efficiency of the auxiliary evaporator 13, the auxiliary air supply at 27 may be drawn in heat exchange relation with cooled vapor and air mixture leaving the evaporator 13 through conduit 12.

Various other changes and modifications may be made within the scope of the invention which is not limited except as indicated in the following claims.

What is claimed is:

1. Refrigeration apparatus including an internal combustion engine, a plurality of places of evaporation, means for conducting air to one of said places of evaporation, means to conduct air to said second place of evaporation, means to conduct liquid fuel to both of said places of evaporation, means to conduct vaporous fuel and air mixture from said first place of evaporation to said second place of evaporation and thence to said engine, said first place of evaporation being arranged in heat transfer relation with an object to be cooled, and said second place of evaporation being arranged in thermal exchange relation with air flowing to said first place of evaporation.

2. Apparatus as set forth in claim 1 in which unevaporated liquid fuel is conducted from said first place of evaporation to said second place of evaporation.

3. Apparatus as set forth in claim 1 in which liquid fuel is syphoned to said second place of evaporation by flow of air to said second place.

4. Apparatus as set forth in claim 1 including a heat exchanger for air flowing to said first place of evaporation and vaporous fuel and air mixture flowing therefrom to said second place of evaporation.

5. A method of refrigeration with the aid of an internal combustion engine which consists in flowing air in separate streams to a plurality of places of evaporation, supplying liquid fuel to said places of evaporation, supplying heat for vaporizing said fuel in one of said places of evaporation by conduction from a body to be cooled, supplying heat for vaporizing said fuel in another of said places of evaporation by conduction from air flowing to said first place of evaporation, flowing vaporous fuel and air mixture from said first place of evaporation to said second place of evaporation and thence to said engine.

6. A method of refrigeration as set forth in claim 5 in which unevaporated liquid fuel is conducted from said first place of evaporation to said second place of evaporation.

7. A method of refrigeration as set forth in claim 5 in which liquid fuel is syphoned to said second place of evaporation by flow of air to said second place.

8. A method of refrigeration as set forth in claim 5 in which heat is exchanged between air flowing to said first place of evaporation and vaporous fuel and air mixture flowing from said first place of evaporation towards said second place of evaporation.

PAUL STRANDBERG.